United States Patent [19]

Krippl et al.

[11] Patent Number: 5,061,453
[45] Date of Patent: Oct. 29, 1991

[54] APPARATUS FOR THE CONTINUOUS CHARGING OF A LIQUID REACTANT WITH GAS FOR THE PRODUCTION OF A FOAMABLE, LIQUID REACTION MIXTURE

[75] Inventors: Kurt Krippl, Monheim; Klaus Schulte, Leverkusen, both of Fed. Rep. of Germany

[73] Assignee: Bayer Aktiengesellschaft, Leverkusen, Fed. Rep. of Germany

[21] Appl. No.: 352,577

[22] Filed: May 16, 1989

[30] Foreign Application Priority Data

May 28, 1988 [DE] Fed. Rep. of Germany ....... 3818161

[51] Int. Cl.⁵ .............................................. B01F 3/04
[52] U.S. Cl. .................... 422/106; 422/111; 422/133; 422/135; 422/231; 261/87; 261/DIG. 26
[58] Field of Search ............... 422/105, 106, 133, 135, 422/231, 111; 366/102, 153, 164, 182, 601; 435/315; 261/86, 87, DIG. 26

[56] References Cited

U.S. PATENT DOCUMENTS

| | | | |
|---|---|---|---|
| 1,633,708 | 6/1927 | Minogue | 366/102 X |
| 2,826,401 | 2/1956 | Peters | 261/87 |
| 3,445,245 | 5/1969 | Ebner | 261/87 X |
| 4,157,427 | 6/1979 | Ferber | 521/133 |
| 4,249,828 | 2/1981 | Condolios | 366/102 |
| 4,267,052 | 5/1981 | Chang | 261/87 X |
| 4,316,875 | 2/1982 | Barth et al. | 261/DIG. 26 |
| 4,376,172 | 3/1983 | Belanger et al. | 521/133 |
| 4,764,536 | 8/1988 | Proksa et al. | 261/87 X |
| 4,933,115 | 6/1990 | Krippl et al. | 422/135 X |
| 4,973,608 | 11/1990 | Krippl et al. | 422/133 X |
| 5,000,882 | 3/1991 | Proska et al. | 422/133 X |
| 5,002,704 | 3/1991 | Krippl et al. | 422/133 X |

*Primary Examiner*—David L. Lacey
*Assistant Examiner*—Jeffrey R. Snay
*Attorney, Agent, or Firm*—Joseph C. Gil

[57] ABSTRACT

An apparatus for continuously charging a liquid reactant with a gas is provided. The gas is dispersed in the reactant through a hollow stirrer in a gassing tank. The quantity of gas introduced per unit time is kept constant.

2 Claims, 2 Drawing Sheets

APPARATUS FOR THE CONTINUOUS CHARGING OF A LIQUID REACTANT WITH GAS FOR THE PRODUCTION OF A FOAMABLE, LIQUID REACTION MIXTURE

BACKGROUND OF THE INVENTION

The present invention relates to a process and an apparatus for the continuous charging of at least one liquid reactant with gas for the production of a foamable, liquid reaction mixture. The gas is dispersed in the reactant by means of a hollow stirrer in a gassing tank. The gas-charged component is then supplied to the other reactant to be mixed therewith.

For the preparation of foams from reactive components (and, in particular, polyurethane foams by the reaction of polyols with isocyanates), it is frequently necessary to disperse gases in a certain proportion in at least one of the reactants before the components are mixed.

We have earlier developed a technique to compare the density of the gassed component with a nominal value and increase or reduce the quantity of gas introduced into the reactant if the density differs from this nominal value (see, German Patent Application P 38 08 082.6). This method fails when small or very small quantities of gas are required to be dispersed in the reactant because the density difference between the gassed component and the ungassed component is then not measurable with sufficient accuracy.

The problem therefore arose of providing a process and apparatus which could be used for dispersing the correct proportion of even minute quantities of gas in at least one of the reactants.

DESCRIPTION OF THE INVENTION

Figure 1:
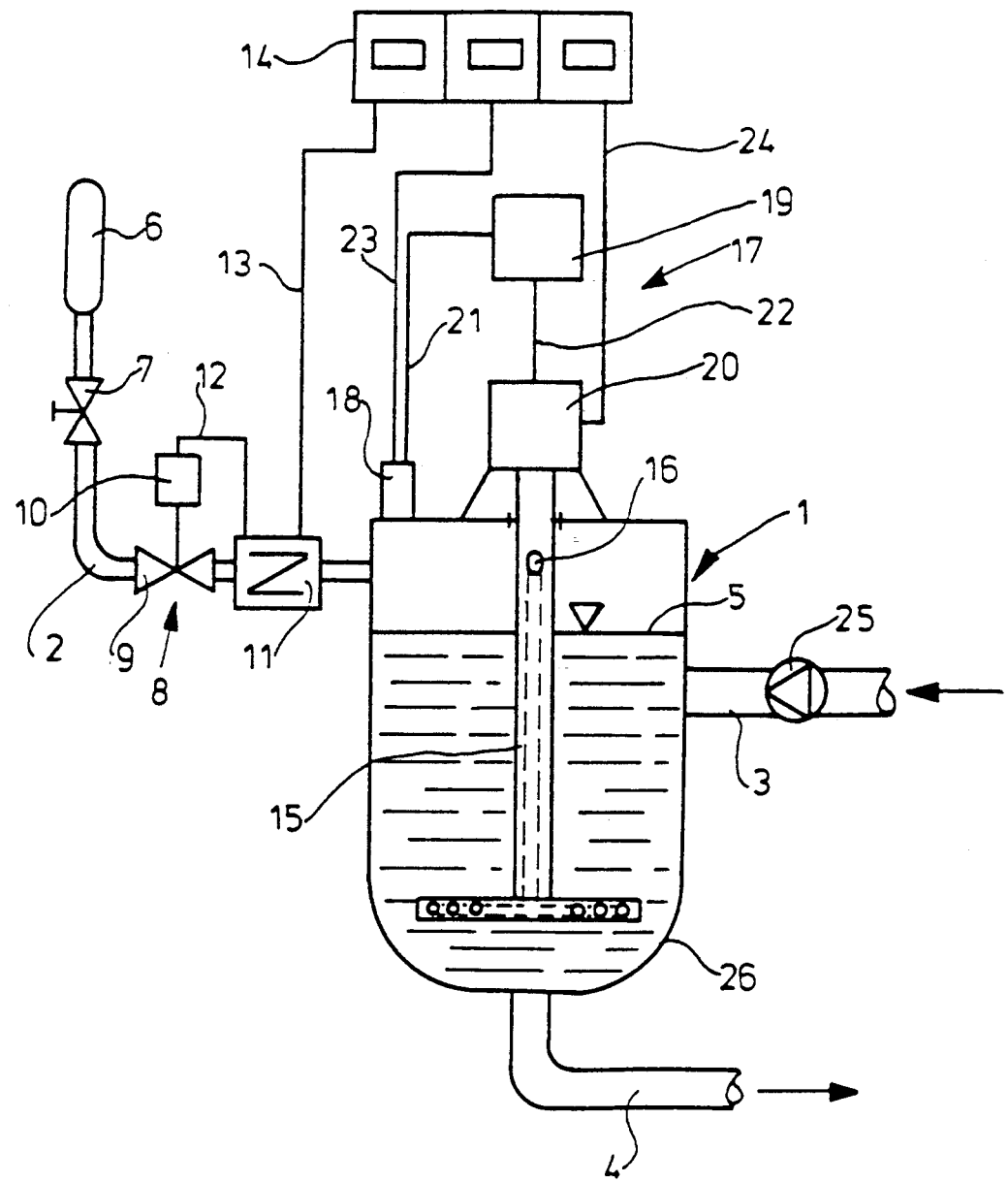
FIGS. 1 and 2 show two embodiments of the present invention.

The above problem is solved by introducing both the reactant and the gas in measured quantities into the gassing tank, with the quantity of gas introduced per unit time being kept constant. The mass flow of gas supplied is continuously measured and is compared with a nominal value. The mass flow of gas is regulated so as to maintain the nominal value. The quantity of gas introduced into the reactant per unit time is kept constant by regulating the speed of rotation of a hollow stirrer in the gassing tank.

By this method, quantities of gas as little as 2 vol.-%, based on the volume of ungassed component, can be dispersed with constant accuracy. The method of regulation enables both fluctuations in the quantity of gas introduced into the gassing tank and fluctuations in the intensity of gassing to be eliminated. The nominal value used for the continuous supply of gas will, of course, be chosen to correspond to the quantity of gas to be dispersed in the component. The particular quantity of gas to be dispersed in the component requires a particular speed of rotation of the hollow stirrer. Since this in turn depends on the construction of the stirrer as well as on the viscosity of the reactant to be gassed, it is necessary first to draw up suitable calibration curves. The regulating procedure is based on this nominal speed of rotation.

According to a first embodiment of the new process, regulation of the speed of the hollow stirrer is achieved by keeping the level in the gassing tank constant.

According to a second method of carrying out this process, the speed of the hollow stirrer is regulated by measuring the quantity of gas flowing into the gassing tank.

The new process is suitable in particular for the introduction of amounts of gas below the saturation point of the gassed component but it may also be employed for charging the reactant with larger quantities of gas in like manner.

In one modification of the new process. regulation of the mass flow of gas may also be employed for premixing two or more different gases in certain proportions The new apparatus for the continuous charging of at least one liquid reactant with gas for the production of a foamable, liquid reaction mixture comprises a gassing tank having a hollow stirrer which can be rotated at an adjustable speed, and which hollow stirrer has a gas intake opening above the level of liquid; a feed-pipe opening into said tank for the ungassed component, a discharge pipe exiting said tank for the gassed component and a gas inlet pipe opening into said tank at a point above the liquid level.

The novelty resides in the fact that i) the gas inlet pipe contains a regulating device consisting of a valve for regulating the rate of throughflow with adjustable drive and, connected thereto, a flow measuring instrument for the gas introduced; and ii) another regulating device is provided, consisting of a level measuring instrument and a speed regulator which is connected both to the level measuring instrument and to the drive for the hollow stirrer.

Conventional dosing pumps hitherto used in the art, such as axial or radial piston pumps, are suitable dosing devices for the reactants, as are also piston dosing apparatus, especially for components which contain filler. A particularly suitable mass flow measuring instrument for the gas is the "Digital Operating and Display Apparatus", Model 147 A of MKS Instruments Deutschland GmbH, Stahlgruberring 13, D-8000 Munich 82. Speed adjustable electric drives are commercially available.

The new apparatus has the particular advantage that it reacts more rapidly than known apparatus operating on the principle of density measurements. Liquid level measuring apparatus are also known in a wide variety of embodiments. Those which enable the liquid level to be absolutely constant are very elaborate but measuring apparatus which can keep the level between two limiting values are also suitable, provided the limiting values can be adjusted to a sufficiently narrow interval for the degree of accuracy of gassing required.

Two exemplary embodiments of the new apparatus are shown purely schematically in the drawings and are described below.

FIG. 1 shows a gassing tank 1 with feed-pipe 2 for gas, a feed-pipe 3 for a reactant which is to be gassed and a discharge pipe 4 for the gassed reactant. The feed-pipe 2 opens into the gassing tank 1 at a point above the liquid level 5 and is connected to a source of gas 6. Viewed in the direction of flow, the feed-pipe 2 contains a pressure reducing valve 7 and a regulating device 8. The latter comprises a throughflow regulating valve 9 with an actuator 10 and mass flow measuring apparatus 11. A pulse line 12 leads from the measuring apparatus 11 to the actuator 10 of the throughflow regulating valve 9. Another pulse line 13 leads to a display board 14. The mass flow measuring apparatus 11 contains a data converter and is adjustable to a selected nominal value. If the actual rate of mass flow deviates from the given nominal value, appropriate impulses are transmitted to the actuator 10 to adjust the regulating valve 9. The gassing tank 1 is fitted with a hollow stirrer 15 which has an intake opening 16 above the liquid level 5. This hollow stirrer 15 is also connected with a control device 17. This control device consists of a level measuring instrument 18, which is fitted to the gassing tank 1 and contains a measured value converter, and of a speed regulator 19 and the drive 20 for the hollow stirrer 15. A pulse line 21 leads from the level measuring instrument 18 to the speed regulator 19 and another pulse line 22 extends from the speed regulator 19 to the drive 20. Another pulse line 23 connects the level measuring apparatus 18 to the display board 14. A pulse line 24 extends from the drive 20 to the display board 14. The level measuring instrument 18 contains two limit value controls which keep the liquid level 5 constant between their two limits. When the liquid level 5 releases the upper limit value control, the speed of rotation of the drive 20 is adjusted to reduce the quantity of gas taken in through the hollow stirrer 15. If the lower limit control responds when the liquid level 5 drops, then the speed of rotation is altered in the other direction. The initial speed of rotation is based on an empirically determined value at which a particular suitable quantity of gas is dispersed in the reactant. A dosing pump 25 is arranged in the feed-pipe 3, which feed-pipe is situated below the liquid level 5. The discharge pipe 4 extends from the bottom 26 of the gassing tank 1 to a mixing head (not shown). The dosing pump 25 could also be arranged in the discharge pipe 4.

Figure 2:
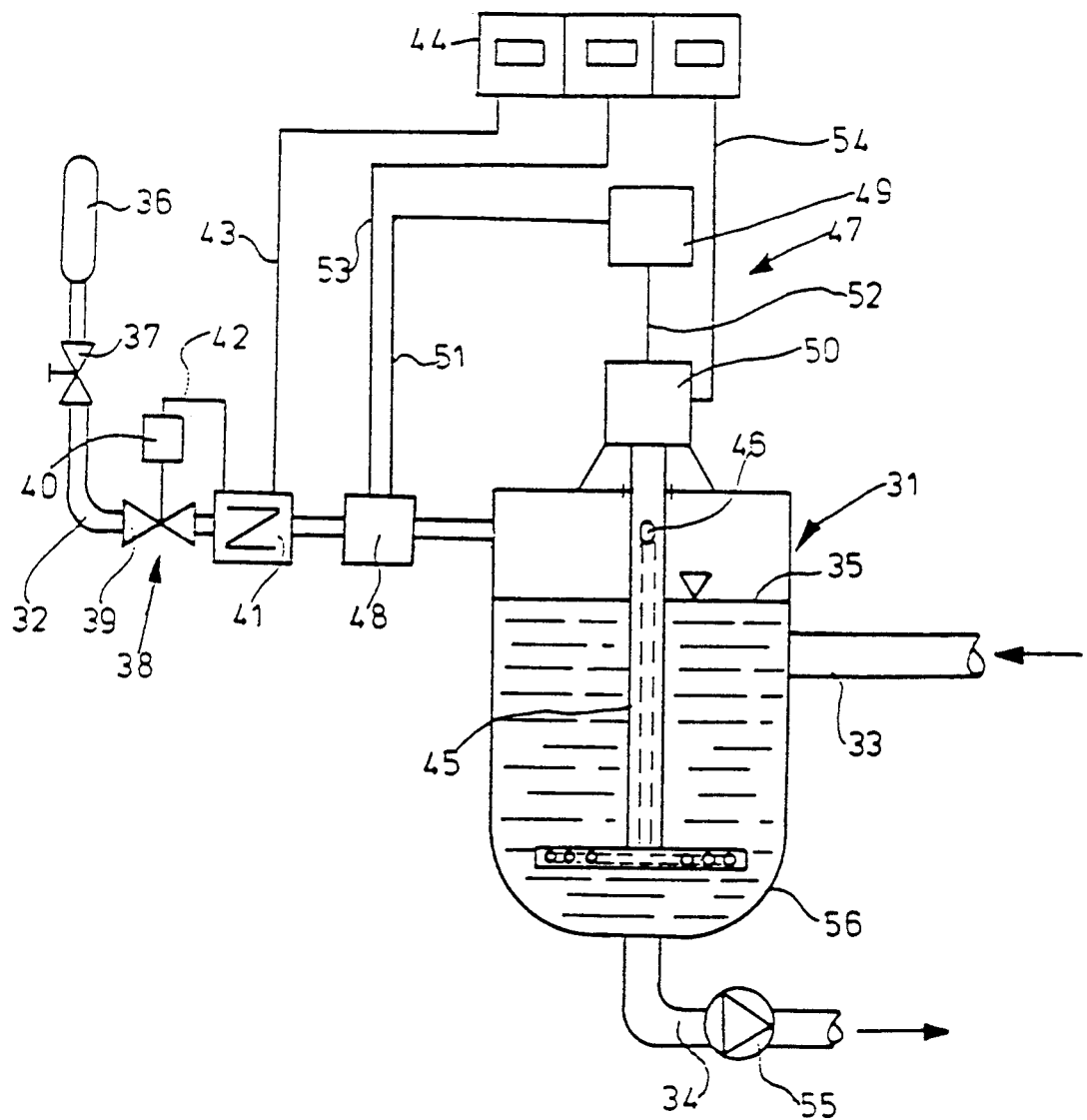

FIG. 2 shows a gassing tank 31 with feed-pipe 32 for gas, a feed-pipe 33 for a reactant which is to be gassed and a discharge pipe 34 for the gassed reactant. The feed-pipe 32 which is connected to a source of gas 36 opens into the gassing tank 31 above the liquid level 35. Viewed in the direction of flow, the gas supply pipe 32 contains a pressure reducing valve 37 and a regulating device 38 comprising a throughflow regulating valve 39 with actuator 40 and mass flow measuring apparatus 41. A pulse line 42 extends from the measuring apparatus 41 to the actuator 40 of the throughflow regulating valve 39. Another pulse line 43 leads to a display board 44. The mass flow measuring apparatus 41 contains a measured value convertor and is adjustable to a desired nominal value. If the actual mass flow deviates from the given value, appropriate impulses are transmitted to the actuator 40 for adjusting the regulating valve 39. The gassing tank 31 contains a hollow stirrer 45 which has an intake opening 46 situated above the liquid 35. This hollow stirrer 45 is also associated with a regulating device 47. This regulating device 47 comprises a gas throughflow measuring apparatus 48 which is arranged in the gas feed-pipe 32 and contains a measured value convertor, a speed regulator 49 and the drive 50 for the hollow stirrer 45. A pulse line 51 extends from the level measuring instrument 48 to the speed regulator 49 and another pulse line 52 extends from the speed regulator to the drive 50. The gas flow measuring apparatus 48 is connected to the display board 54 by another pulse line 53. The drive 50 is connected to the display board 44 through a pulse lead 54. If the gas flow meter 48 shows that the rate of throughflow is too low, the speed of the drive 50 is altered to reduce the quantity of gas taken in by the hollow stirrer 45. If the rate of throughflow is shown to be too high, the speed is altered in the other direction. The initial speed is based on an empirically determined value at which a particular, suitable quantity of gas is introduced into the reactant. The feed-pipe 33 opens below the liquid level 35. The discharge pipe 34, which contains a dosing pump 55, extends from the bottom 56 of the gassing tank 31 and leads to a mixing head (not shown). The dosing pump 55 may also be arranged in the feed-pipe 33.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for the continuous charging of at least one liquid reactant with a gas comprising:
   a) a gassing tank having a hollow stirrer therein, said hollow stirrer having a speed adjustable drive and a gas intake opening,
   b) a feed pipe for ungassed reactant opening into said tank,
   c) a discharge pipe for reactant charged with gas exiting said tank,
   d) a gas inlet pipe opening into said tank,
   e) a control device arranged in said gas inlet pipe, said control device comprising 1) a throughflow regulating valve with actuator and 2) a mass flow meter for measuring the gas supplied to said tank, said mass flow meter operatively connected to said actuator so as to maintain a substantially constant mass flow in said gas inlet pipe, and
   f) a regulating device comprising 1) a level measuring means for measuring liquid level in said tank and 2) a speed regulator which is operatively connected to said level measuring instrument and said adjustable drive so as to maintain a substantially constant liquid level in said tank.

2. An apparatus for the continuous charging of at least one liquid reactant with a gas comprising:
   a) a gassing tank having a hollow stirrer therein, said hollow stirrer having a speed adjustable drive and a gas intake opening,
   b) a feed pipe for ungassed reactant opening into said tank,
   c) a discharge pipe for reactant charged with gas exiting said tank,
   d) a gas inlet pipe opening into said tank,
   e) a control device arranged in said gas inlet pipe, said control device comprising 1) a throughflow regulating valve with actuator and 2) a mass flow meter for measuring the gas supplied to said tank, said mass flow meter operatively connected to said actuator so as to maintain a substantially constant mass flow in said gas inlet pipe, and
   f) a regulating device comprising 1) a gas throughflow meter arranged in said gas inlet pipe and 2) a speed regulator which is operatively connected to said gas throughflow meter and said adjustable drive so as to regulate the speed of rotation of said hollow stirrer responsive to the measured quantity of gas flowing through said gas inlet pipe.

* * * * *